July 25, 1944.　　　J. D. NOBLE ET AL　　　2,354,474
TURNBUCKLE
Filed Sept. 14, 1942
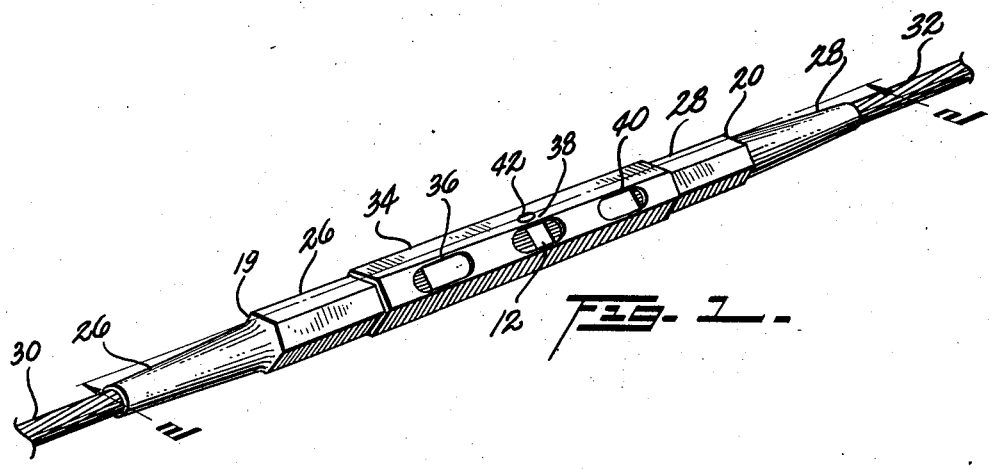
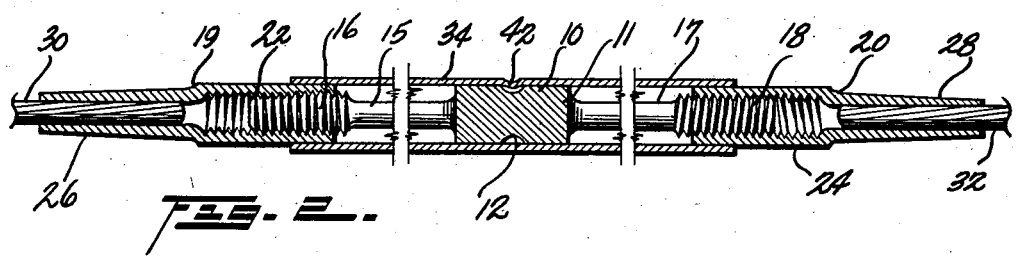
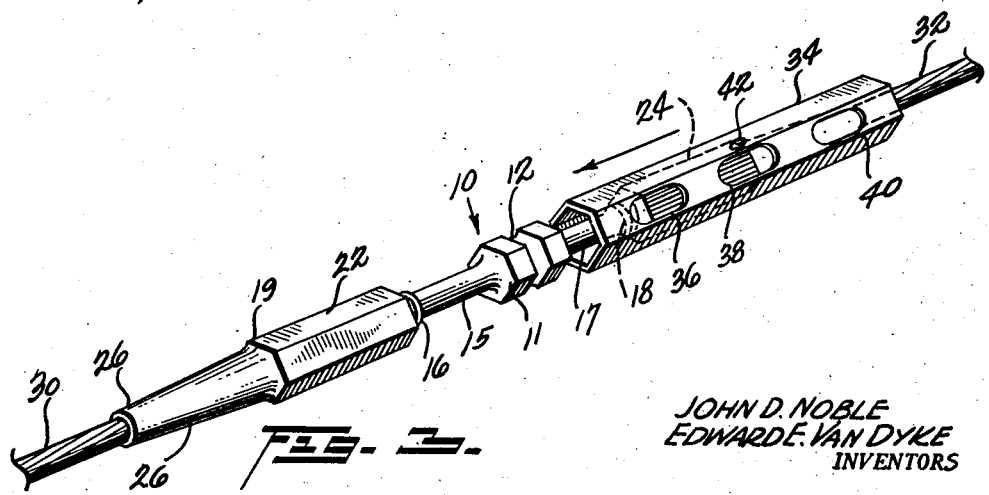
JOHN D. NOBLE
EDWARD E. VAN DYKE
　　　　　INVENTORS
BY *Edwin Coates*
ATTORNEY Patented July 25, 1944

2,354,474

UNITED STATES PATENT OFFICE 2,354,474

TURNBUCKLE

John D. Noble, Santa Monica, and Edward E. Van Dyke, Sherman Oaks, Calif., assignors to Douglas Aircraft Company, Inc., Santa Monica, Calif.

Application September 14, 1942, Serial No. 458,314

8 Claims. (Cl. 287—60)

This invention relates to turnbuckles and particularly to turnbuckles adapted for the adjustment of tension in airplane control cables or the like.

The turn buckles on the control cables of an airplane are subjected to great tensile and torsional stresses in normal flight. These stresses are sometimes so great that the safety wires used to keep the turnbuckles in proper adjustment are sheared, permitting the turnbuckle parts to become unscrewed and rendering the control cables useless.

The end fittings of the usual type turnbuckle which are swaged to the cable ends are externally threaded for engagement with the connector. Before the parts are joined together in the airplane the threaded end of a fitting is therefore exposed. Generally these cables are of considerable length and in the rigging operations it is necessary to draw them through several bulkheads in order to get them to their correct position. After a threaded cable fitting has been drawn across metal edges several times the threads become mutilated requiring that they be reworked.

Furthermore, it is desirable that the threaded end fitting of a turnbuckle have high tensile strength. However, if steel having a high tensile strength is used, since such steel is by its nature subject to hardening when swaged, the end fitting becomes brittle and subject to fracture.

It is therefore necessary to make the end fittings of a low tensile strength steel and of large cross section, which increases the size of the other parts of the turnbuckle, thus sacrificing lightness and small size for safety.

By this invention a turnbuckle is provided which eliminates the above objectionable features and has the added advantage of being much simpler to install in the airplane. The device comprises two thimbles, swaged to the cable ends, each of which thimbles is internally threaded. These internally threaded thimbles cooperate with correspondingly externally threaded end portions of a central adjustment connection member. The thimbles and center portion of the connection member are of hexagonal shape, receiving a hexagonal locking sleeve to hold them against accidental rotation to each other. This design also enables the use of steel of low tensile strength in the cable end fittings without unduly increasing the size and weight of the complete articles.

One object of this invention is to provide a strong safe turnbuckle which is simple to construct and easy to install.

Another object of the invention is to provide a turnbuckle cable fitting, the threads of which, when it is drawn through the airplane structure, will not be mutilated.

Another object of the invention is to provide a turnbuckle combining maximum tensile strength of the turnbuckle parts with a small number of parts of minimum size.

Another object of this invention is to provide a turnbuckle structure, the parts of which are securely locked against becoming accidentally unscrewed and which minimizes the likelihood of breakage of the parts under unusual torsional stresses.

Still another object of this invention is to provide a quick inspection means for readily determining the relative position of the turnbuckle parts.

Further objects and advantages of this invention will be brought out in the following description taken in connection with the accompanying drawing and appended claims.

Referring now to the drawing:

Figure 1 is a perspective view showing one embodiment of our invention.

Figure 2 is a central longitudinal sectional view of the turnbuckle.

Figure 3 is a perspective view similar to Figure 1, showing the method of removing the sleeve to make adjustments on the turnbuckle.

Figure 2 shows a turnbuckle comprising a central adjusting connection member 10, the central portion 11 of which is hexagonal in shape and is formed with an annular groove 12 intermediate its ends. Oppositely aligned rods 15 and 17 having oppositely handed external threads 16 and 18 at their outer ends are integral parts of the connection member 10, extending outwardly from the central portion 11. The rods 15 and 17 threadedly engage a pair of thimbles 19 and 20 which have internally threaded inner end portions 22 and 24 respectively, of hexagonal external transverse contour.

Outer, preferably conically shaped, end portions 26 and 28 of the thimbles are swaged to a pair of cable ends 30 and 32 respectively, inserted within the bores of the thimbles. A hexagonal sleeve 34 is slidable over the hexagonal thimble ends 22 and 24 and the hexagonal central portion 11 of the connection member 10, thereby holding the thimbles against rotation relative to the connection member 10.

As shown in Figures 1 and 3 the sleeve 34 is provided with three inspection window cutouts 36, 38 and 40 which enable the mechanics to readily determine the relative position of the turnbuckle parts.

It is common practice to install the cables in their proper position in the airplane with respect to location of the inspection doors. After the installation they must be inspected for proper assembly and particularly to see that an adequate number of threads of the rods 15 and 17 are in engagement with the thimbles. Production is facilitated by the greater speed of inspection thus attained.

A dimple 42 is positioned in a face of the sleeve 34 adjacent the face of the cutout 38 and is adapted to engage the annular groove 12, acting as a resilient catch to secure the sleeve in the locked position shown in Figure 1. The dimple 42 is thus positioned close to the edge of the cutout, increasing the resilience of action of the dimple, and facilitating the movement of the sleeve on the turnbuckle in installation and in making adjustments in the cables, especially in view of the tolerance departures permitted in the dimensions of the faces of the sleeve 34 and central portion 11 of the connection member.

The construction features of this turnbuckle permit a finer adjustment than has been possible heretofore. The usual type of turnbuckle is secured by a safety wire so that the barrel of the device must be given at least one complete half turn to reinstall the safety wire. On the other hand with a turnbuckle of this invention the hexagonal portions of the parts are so related to the hexagonal sleeve that it is possible to get a relative adjustment of the thimbles in increments of one-twelfth turn. The hexagonal sleeve on the hexagonal portions of the turnbuckle also affords a means for readily unlocking the thimbles, adjusting them to the desired tension and relocking them.

All parts of the turnbuckle are made of non-corrodible metals to avoid deterioration in use, particularly under salt water conditions. Since non-corrodible metals which will swage without work-hardening, such as an 18% chromium, 8% nickel steel having .15-.18% selenium, are of relatively low tensile strength, and since the thimbles should be made of a material which will not work harden they should be of relatively large cross sectional area to resist tensile and flexing stresses. This large cross sectional area is secured as a result of the tubular shape of the inner end portions of the thimbles of this invention, a shape made possible because of their internally threaded character in contrast to the externally threaded solid inner shanks of the present type of turnbuckle ends.

On the other hand the connection member 10, which is not swaged, may be made of a high tensile strength steel, such as cold drawn KR Monel metal, to take care of tensile and flexing stresses, permitting the use of rods 15 and 17 of small diameter and cross sectional areas.

The small diameter of the connecting rods permits the reduction of the outside diameter of the thimbles to the smallest size consistent with the structural strength required in the thimbles, reducing the size and lightening the weight of the turnbuckle as a whole, a great advantage in its use for some purposes as in aircraft manufacture. The high tensile strength of the material of the connection member is also an advantage because the small diameter required in the rods makes it possible to give the root of the threaded portions 16 and 18 a larger diameter than that of the rods without unduly adding to the weight and size of the turnbuckle. The larger thread diameter prevents failure of the connection members at the point of stress concentration in the threads adjacent the rods by reason of the fact that the same stress load carried by both the rods and threads is higher per unit of cross sectional area in the rods than in the threaded portions. Also, by reason of the relative size of threads and rods, the thimbles may be turned inwardly into overlying relationship with the rods should this be necessary in making adjustments of the turnbuckle.

While there have been described herein certain embodiments of this invention, the invention is not to be understood as confined to these particular embodiments, but is to be given the definition and scope expressed in the following claims.

We claim:

1. In a turnbuckle, the combination of: a pair of fittings for securement to the connectible ends of flexible elongated tension members and having internally oppositely threaded inwardly opening bores; a connection member having externally threaded ends engaging within said bores; a sleeve longitudinally slidably fitting over said fittings and connection member, said sleeve having portions of non-circular cross section, and said fittings and connection member having portions of non-circular cross section on their slidable surfaces cooperating with said sleeve portions respectively to prevent relative rotation with respect to said sleeve and consequently to each other.

2. The combination defined in claim 2 and in addition thereto; a resilient detent means between said sleeve and connection member to prevent relative longitudinal movement thereof, said detent means being automatically releasable upon the application of a longitudinally directed force to said sleeve.

3. In a turnbuckle, the combination of: a pair of fittings for securement to the connectible ends of flexible elongated tension members and having internally oppositely threaded inwardly opening bores, and having outwardly opening bores for receiving and having swaged therein the connectible ends of flexible elongated metallic tension members; a connection member having externally threaded ends engaging within the said bores; and a locking member longitudinally movable along said fittings and connection member and securable against relative rotation to both fittings and the connection member in a median longitudinal position, to the connection member and one of the fittings only in a longitudinally displaced position toward said one fitting and to one of the fittings only when further longitudinally displaced toward said one fitting.

4. The combination defined in claim 3 in which said fittings and a central portion of said connection member have the external contour of a regular polygon in cross section and the locking member is a sleeve having the internal contour of a regular polygon in cross section sized to give the sleeve a close fitting sliding relationship with said fittings and connection member.

5. In a turnbuckle the combination of: a pair of fittings having internally oppositely threaded inwardly opening bores and having outwardly opening bores for receiving and having swaged therein the connectable ends of flexible elongated metallic tension members, said fittings having the external contour of a regular polygon; a central connection member having externally threaded ends engaging within said threaded bores and a central transversely enlarged body having the external cross sectional contour of said regular polygon; and a locking sleeve polygonally shaped to have a close sliding engagement with said fittings and body, and longitudinally movable therealong to engage selectively a fitting only, the body and a fitting only or both fittings and the body.

6. The combination defined in claim 5 and in addition thereto a means for releasably positioning said sleeve longitudinally centrally of said body.

7. The combination defined in claim 5 in which one polygonal face of said sleeve is formed with a dimple and an adjacent face of said sleeve is formed with an inspection aperture transversely aligned with said dimple, and in which said body is formed with an annular groove for transverse alignment with said dimple when the locking sleeve is in normal locking position.

8. In a turnbuckle, the combination of: a pair of fittings for securement to the connectible ends of flexible elongated tension members and having oppositely threaded inwardly extending ends; a connection member having threaded ends threadedly engaging and longitudinally connecting said fitting ends, respectively, said fittings and said connection member having at their respective longtiudinal portions of maximum thickness the sectional shapes of a regular polygon of the same size and number of sides; a locking sleeve polygonally shaped and sized to have a close fitting telescopic engagement with said portions of said fittings and connection member, and longitudinally movable therealong to engage selectively a fitting only, the body and a fitting only, or both fittings and the body; and means for releasably locking the sleeve in the last mentioned of said selective positions.

JOHN D. NOBLE.
EDWARD E. VAN DYKE.